United States Patent
Kumar et al.

(10) Patent No.: US 10,218,471 B1
(45) Date of Patent: Feb. 26, 2019

(54) SELECTION OF POSITIONING REFERENCE SIGNAL OCCASIONS

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/997,905

(22) Filed: Jun. 5, 2018

(51) Int. Cl.
| | |
|---|---|
| *H04L 5/00* | (2006.01) |
| *G01S 1/20* | (2006.01) |
| *H04L 27/26* | (2006.01) |
| *H04W 72/08* | (2009.01) |
| *H04L 27/00* | (2006.01) |

(52) U.S. Cl.
CPC .............. *H04L 5/0007* (2013.01); *G01S 1/20* (2013.01); *H04L 5/0053* (2013.01); *H04L 27/0012* (2013.01); *H04L 27/2601* (2013.01); *H04W 72/082* (2013.01)

(58) Field of Classification Search
CPC ..... H04W 64/00; H04W 4/023; H04W 88/02; H04W 64/006; H04W 4/025; H04W 4/02; H04W 88/08; H04W 24/10; H04W 64/003; H04W 24/08; H04W 48/12; H04W 4/021; H04W 48/18; H04W 4/029; H04W 72/12; H04W 72/1226; H04W 72/085
USPC ............ 455/456.1, 404.2, 436, 456.2, 456.5, 455/550.1
See application file for complete search history.

(56) References Cited

U.S. PATENT DOCUMENTS

| | | | | |
|---|---|---|---|---|
| 2012/0307670 | A1* | 12/2012 | Kazmi | H04W 24/10 370/252 |
| 2014/0295881 | A1* | 10/2014 | Werner | H04W 4/023 455/456.1 |
| 2016/0195601 | A1* | 7/2016 | Siomina | G01S 5/0205 455/456.1 |

* cited by examiner

*Primary Examiner* — Fred A Casca
(74) *Attorney, Agent, or Firm* — Holland & Hart LLP

(57) ABSTRACT

Methods, systems, and devices for wireless communications are described. A user equipment (UE) may support selection of positioning reference signal (PRS) occasions. For example, a UE may identify a first pair of PRS occasions for monitoring a PRS at a first frequency and a second pair of PRS occasions for monitoring a PRS at a second frequency and occurring after the first pair of PRS occasions. The UE may measure a first PRS of the first pair of PRS occasions at the first frequency, and then measure a first PRS of the second pair of PRS occasions at the second frequency. The UE may then measure a second PRS of the first pair of PRS occasions at the first frequency after measuring the first PRS of the second pair of PRS occasions at the second frequency.

20 Claims, 12 Drawing Sheets

SELECTION OF POSITIONING REFERENCE SIGNAL OCCASIONS

BACKGROUND

The following relates generally to wireless communications, and more specifically to selection of positioning reference signal (PRS) occasions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may transmit a signal such as a PRS at a set interval (e.g., a PRS occasion) to a UE. The UE may perform PRS measurements using the PRS received from the base station. In some examples, a UE may be a Narrowband Internet of Things (NB-IoT) device. In this case, measuring PRS across multiple PRS occasions may be inefficient because some NB-IoT devices support low data rate and power consumption compared to other UEs (e.g., legacy UEs). Improved selection of PRS occasions is desired.

SUMMARY

The described techniques relate to improved methods, systems, devices, and apparatuses that support selection of PRS occasions. A UE may support selection of PRS occasions by determining an order of PRS occasions to be measured across different frequencies that would provide the measurement in a shortest duration thereby causing minimum current consumption across all possible measurement combinations for the UE. In some examples, determining the order of PRS occasions may be based on a time difference between an end time of a first PRS of an initial pair of PRS occasions at a source frequency and a start time of a first PRS of a succeeding pair of PRS occasions at a target frequency. The UE may also evaluate a tuning time for tuning a receiver of the UE from the source frequency to the target frequency. Based on the determined order the UE may monitor and measure PRS transmitted from a base station and/or a location server in an efficient manner.

A method of wireless communications at a UE is described. The method may include identifying a first pair of PRS occasions for monitoring a PRS at a first frequency and a second pair of PRS occasions for monitoring a PRS at a second frequency and occurring after the first pair of PRS occasions, measuring a first PRS of the first pair of PRS occasions at the first frequency, measuring a first PRS of the second pair of PRS occasions at the second frequency, and measuring a second PRS of the first pair of PRS occasions at the first frequency after measuring the first PRS of the second pair of PRS occasions at the second frequency.

An apparatus for wireless communications is described. The apparatus may include a processor, memory in electronic communication with the processor, and instructions stored in the memory. The instructions may be executable by the processor to cause the apparatus to identify a first pair of PRS occasions for monitoring a PRS at a first frequency and a second pair of PRS occasions for monitoring a PRS at a second frequency and occurring after the first pair of PRS occasions, measure a first PRS of the first pair of PRS occasions at the first frequency, measure a first PRS of the second pair of PRS occasions at the second frequency, and measure a second PRS of the first pair of PRS occasions at the first frequency after measuring the first PRS of the second pair of PRS occasions at the second frequency.

Another apparatus for wireless communications is described. The apparatus may include means for identifying a first pair of PRS occasions for monitoring a PRS at a first frequency and a second pair of PRS occasions for monitoring a PRS at a second frequency and occurring after the first pair of PRS occasions, measuring a first PRS of the first pair of PRS occasions at the first frequency, measuring a first PRS of the second pair of PRS occasions at the second frequency, and measuring a second PRS of the first pair of PRS occasions at the first frequency after measuring the first PRS of the second pair of PRS occasions at the second frequency.

A non-transitory computer-readable medium storing code for wireless communications at a UE is described. The code may include instructions executable by a processor to identify a first pair of PRS occasions for monitoring a PRS at a first frequency and a second pair of PRS occasions for monitoring a PRS at a second frequency and occurring after the first pair of PRS occasions, measure a first PRS of the first pair of PRS occasions at the first frequency, measure a first PRS of the second pair of PRS occasions at the second frequency, and measure a second PRS of the first pair of PRS occasions at the first frequency after measuring the first PRS of the second pair of PRS occasions at the second frequency.

Some examples of the method, apparatuses, and non-transitory computer-readable medium described herein may further include operations, features, means, or instructions for measuring a second PRS of the second pair of PRS occasions at the second frequency after measuring the second PRS of the first pair of PRS occasions at the first frequency.

Some examples of the method, apparatuses, and non-transitory computer-readable medium described herein may further include operations, features, means, or instructions for tuning from the first frequency to the second frequency, subsequent to measuring the second PRS of the first pair of PRS occasions at the first frequency, where measuring the second PRS of the second pair of PRS occasions may be further based on the tuning.

Some examples of the method, apparatuses, and non-transitory computer-readable medium described herein may further include operations, features, means, or instructions for determining a time difference between an end time of the first PRS of the first pair of PRS occasions and a start time of the first PRS of the second pair of PRS occasions and determining a tuning time for tuning a receiver of the UE from the first frequency to the second frequency, where measuring the first PRS of the second pair of PRS occasions at the second frequency may be further based on the time difference and the tuning time.

Some examples of the method, apparatuses, and non-transitory computer-readable medium described herein may further include operations, features, means, or instructions for identifying, from a set of pairs of PRS occasions, the second pair of PRS occasions for monitoring a PRS at the second frequency based on PRS scheduling information and identifying, from the set of pairs of PRS occasions, a third pair of PRS occasions for monitoring a PRS at a third frequency based on the PRS scheduling information, where the set of pairs of PRS occasions includes the first pair of PRS occasions.

Some examples of the method, apparatuses, and non-transitory computer-readable medium described herein may further include operations, features, means, or instructions for determining a time difference between an end time of the first PRS of the first pair of PRS occasions and a start time of a first PRS of the third pair of PRS occasions and determining a tuning time for tuning the receiver of the UE from the first frequency to the third frequency.

Some examples of the method, apparatuses, and non-transitory computer-readable medium described herein may further include operations, features, means, or instructions for comparing at least one of the time difference or the tuning time for the second pair of PRS occasions with at least one of the time difference or the tuning time for the third pair of PRS occasions and selecting the second pair of PRS occasions based on the comparing, where measuring the first PRS of the second pair of PRS occasions at the second frequency may be further based on the selecting.

Some examples of the method, apparatuses, and non-transitory computer-readable medium described herein may further include operations, features, means, or instructions for determining whether the second pair of PRS occasions may be separated from the first pair of PRS occasions by a period that may be above a threshold, where selecting the second pair of PRS occasions may be further based on determining that the period may be above the threshold.

Some examples of the method, apparatuses, and non-transitory computer-readable medium described herein may further include operations, features, means, or instructions for identifying whether a frequency band of the first frequency may be different from a frequency band of the second frequency or the third frequency, or both, where determining the tuning time for tuning the receiver of the UE from the first frequency to the second frequency or the third frequency may be further based on whether the frequency band of the first frequency may be different from the frequency band of the second frequency or the third frequency, or both.

In some examples of the method, apparatuses, and non-transitory computer-readable medium described herein, the first frequency, the second frequency, and the third frequency are different.

Some examples of the method, apparatuses, and non-transitory computer-readable medium described herein may further include operations, features, means, or instructions for retrieving the PRS scheduling information from local memory of the UE, the PRS scheduling information including the set of pairs of PRS occasions and a PRS periodicity of the set of pairs of PRS occasions and transmitting the PRS scheduling information to a location server.

Some examples of the method, apparatuses, and non-transitory computer-readable medium described herein may further include operations, features, means, or instructions for receiving, from a location server, a message including instructions to perform PRS measurements according to a PRS occasion order configured by the location server based on the transmitting, where measuring the first pair of PRS occasions, the second pair of PRS occasions, or the third pair of PRS occasions, or a combination thereof may be further based on the PRS occasion order configured by the location server.

Some examples of the method, apparatuses, and non-transitory computer-readable medium described herein may further include operations, features, means, or instructions for identifying that a frequency band of the first frequency may be different from a frequency band of the second frequency and determining a frequency separation between the first frequency and the second frequency, where determining the tuning time for tuning the receiver of the UE from the first frequency to the second frequency may be further based on the frequency separation.

Some examples of the method, apparatuses, and non-transitory computer-readable medium described herein may further include operations, features, means, or instructions for tuning from the first frequency to the second frequency, subsequent to measuring the first PRS at the first frequency, where measuring the first PRS of the second pair of PRS occasions at the second frequency may be further based on the tuning.

Some examples of the method, apparatuses, and non-transitory computer-readable medium described herein may further include operations, features, means, or instructions for tuning from the second frequency to the first frequency, subsequent to measuring the first PRS of the second pair of PRS occasions at the second frequency, where measuring the second PRS of the first pair of PRS occasions at the first frequency may be further based on the tuning.

Some examples of the method, apparatuses, and non-transitory computer-readable medium described herein may further include operations, features, means, or instructions for generating a PRS measurement report, establishing an RRC connection with a base station or a location server, or both and transmitting the PRS measurement report to the base station or the location server, or both.

DETAILED DESCRIPTION

Generally, the described techniques relate to improved methods, systems, devices, and apparatuses that support selection of PRS occasions. In some cases, the techniques described herein may support measuring a PRS at an NB-IoT device. As part of measuring PRS on multiple frequencies to determine a position or location of (or other information related to or about) the NB-IoT device, the device may perform inter-frequency (IF) measurements by tuning a receiver to a respective target frequency. A switching time associated with the tuning of the receiver may be based on a difference between a target band and source band, or a frequency separation between the target frequency and the source frequency, or both. In other techniques, an order of performing the PRS measurements on different inter-frequencies may be nonconfigurable and may otherwise be set i.e., may be non-dynamic. According to the described techniques herein, the NB-IoT device may reconfigure the order of PRS measurements related to different PRS measurement occasions.

For example, an NB-IoT device may identify a time difference between an end time of a first PRS occasion and a start time of a second PRS occasion. The first PRS occasion may be associated with a source frequency and the second PRS occasion may be associated with a target frequency. The NB-IoT device may determine a switching time for tuning a receiver from the source frequency to the target frequency based on parsing a lookup table (LUT). As a result, for at least some if not every PRS measurement at the source frequency, the NB-IoT device may determine and identify one or more neighbors at the target frequency based on the time difference being greater than the switching time in the upcoming PRS occasion. In some examples, the upcoming PRS occasion may be separated by a gap interval that is greater than the time difference. In scenarios where multiple IF neighbors satisfy the above criterion, the NB-IoT device may select a neighbor with a lower (e.g., a minimum) time difference.

The NB-IoT device may determine the order of PRS occasions to be measured across different IF neighbors and the order determined may provide the measurement in shortest amount of time; thereby causing minimum current consumption across all possible measurement combinations. In that way, the NB-IoT device may perform PRS measurements in an efficient manner (e.g., preserving low power consumption and limiting a duration that an NB-IoT device is active for a PRS measurement occasion).

Aspects of the disclosure are initially described in the context of a wireless communications system. Aspects of the disclosure are further described in the context of a timing diagram and process flow. Aspects of the disclosure are further illustrated by and described with reference to apparatus diagrams, system diagrams, and flowcharts that relate to selection of positioning reference signal occasions.

Figure 1:
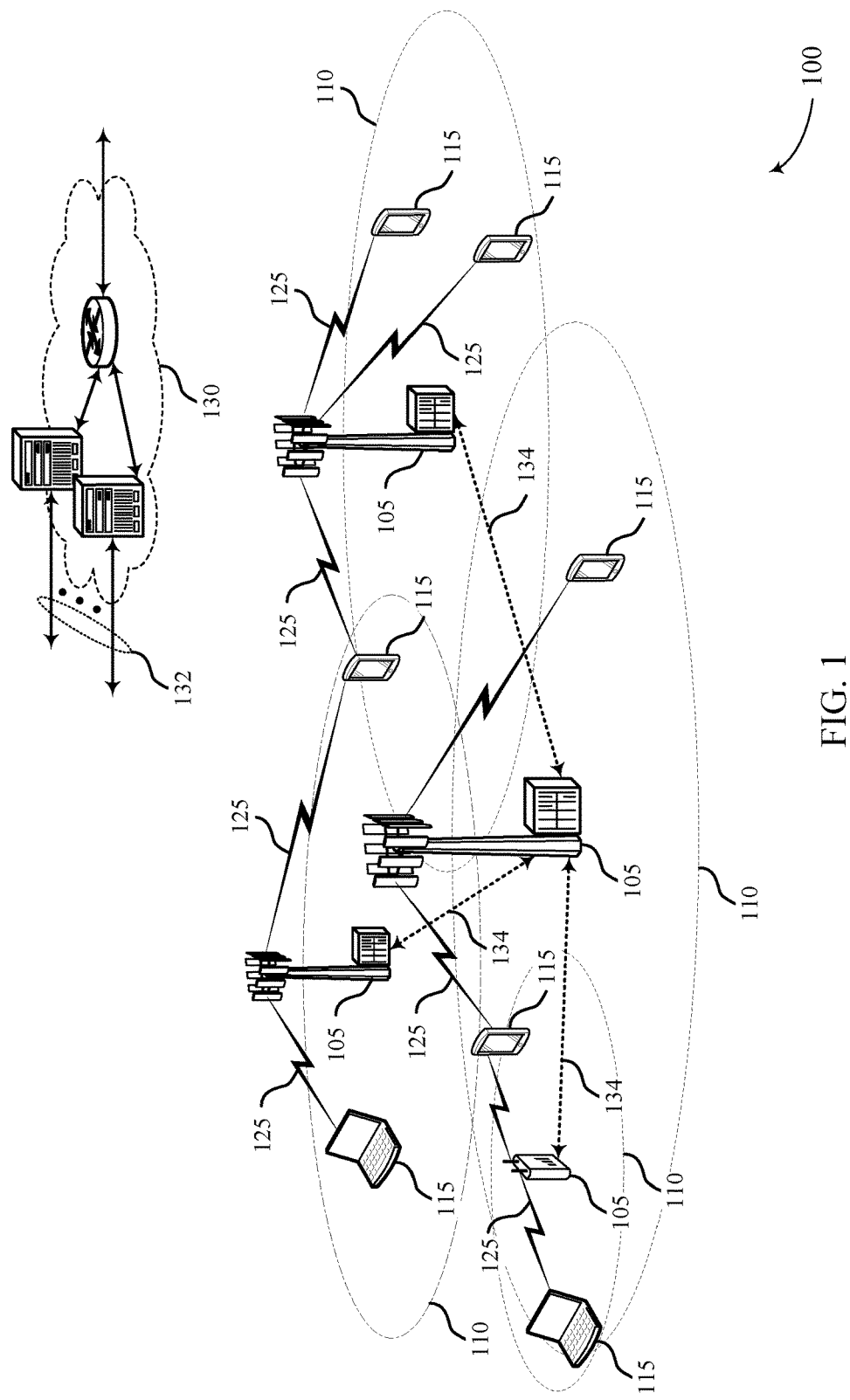
FIGS. 1 and 2 illustrate examples of a wireless communications system that supports selection of PRS occasions in accordance with aspects of the present disclosure.

FIG. 1 illustrates an example of a wireless communications system 100 that supports selection of positioning reference signal occasions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

A base station 105 may transmit a PRS at a set interval (e.g., a PRS occasion) to a UE 115. The UE 115 may perform PRS measurements using the PRS received from the base station 105 to determine a position of the UE 115 from its PRS measurements (among other information). In some examples, a UE 115 may be an NB-IoT device that supports low data rate communication. Unlike a legacy LTE UE having multiple CA receiver chains, the NB-IoT device may support a single receive/transmit chain. Additionally, the NB-IoT device may be incapable of performing OTDOA for positioning in RRC connected mode. To perform the OTDOA measurements, the NB-IoT device may be released to idle mode, perform positioning measurements, and then establish an RRC connection to deliver positioning measurements to the base station 105. In the example case where UE 115 may be an NB-IoT device, measuring PRS across multiple PRS occasions may be inefficient because NB-IoT devices are configured to support low data rate and provide low power consumption compared to other UEs (e.g., legacy UEs). Thereby, it may be important for UEs 115 operating as NB-IoT devices to perform PRS measurements quickly (e.g., as fast as possible) to maintain the receiver active for a minimal duration.

Other techniques for performing PRS measurements, however, may be deficient for NB-IoT devices because the receiver remains active for a longer duration to perform all PRS measurements in a consecutive order. As a result, these techniques may present significant measurements latencies that may impact the overall system throughput for NB-IoT devices. To perform PRS measurements in an efficient manner, the UE 115 may determine an order of PRS occasions to be measured across different IF that would provide the measurement in the least time period thereby causing minimum current consumption across all possible measurement combinations.

Figure 2:
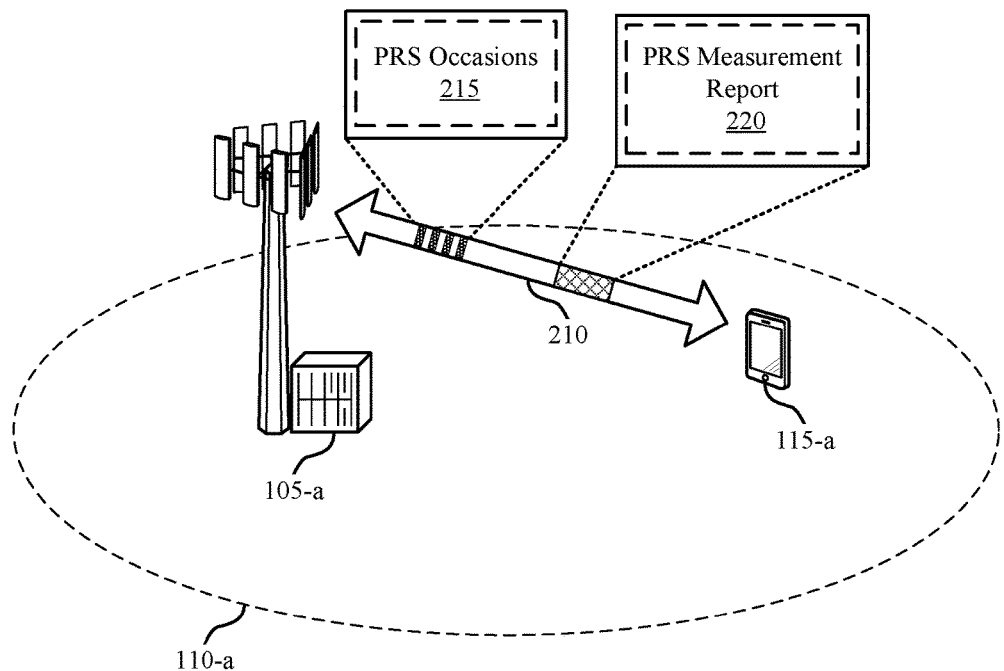

FIG. 2 illustrates an example of a wireless communications system 200 that supports selection of PRS occasions in accordance with aspects of the present disclosure. In some examples, wireless communications system 200 may implement aspects of wireless communications system 100. The wireless communications system 200 may include base station 105-a and UE 115-a, which may be examples of the corresponding devices described with respect to FIG. 1. In some examples, wireless communications system 200 may additionally or alternatively include a location server (not shown), which may communicate, with the base station 105-a and/or the UE 115-a, PRS-related information (e.g., PRS, PRS scheduling information, PRS occasions, PRS measurement reports). The base station 105-a may provide service for a geographic area 110-a as described with respect to FIG. 1.

The wireless communications system 200 may support performing PRS measurements in an efficient manner to enhance communication (e.g., reliability, reduced latency) in the wireless communications system 200. For example, the wireless communications system 200 may be an LTE URLLC system or an NR URLLC system, etc., in which base station 105-a and/or UE 115-a may support selection of PRS occasions to perform PRS measurements. The base station 105-a may, in some examples, perform a communication procedure (e.g., an RRC procedure, such as a cell acquisition procedure, random access procedure, RRC connection procedure, RRC configuration procedure) with the UE 115-a.

The base station 105-a may be configured with multiple antennas, which may be used for directional or beamformed transmissions. As part of the communication procedure, the base station 105-a may provide PRS scheduling information to the UE 115-a on resources of a carrier during a transmission time interval (TTI) (also referred to herein as a slot) or an sTTI (also referred to herein as a subslot). For example, the base station 105-a may transmit PRS scheduling information in a downlink control information (DCI) transmitted to the UE 115-a on a PDCCH. PRS scheduling information may include a number of pairs of PRS occasions, a PRS periodicity of the pairs of PRS occasions, a PRS bandwidth (e.g., specifies the bandwidth (RBs) that are used to configure the PRS), a PRS subframe offset, etc.

Additionally or alternatively, as part of the communication procedure, the base station 105-a may configure the UE 115-a through downlink transmissions (e.g., higher-layer signaling, RRC signaling), as part of the communication procedure. For example, the base station 105-a may configure the UE 115-a with PRS configuration for a PRS schedule including resource allocation (e.g., time and frequency resources). The UE 115-a may additionally or alternatively have PRS scheduling information stored in local memory, which the UE 115-a may share with the base station 105-a.

A TTI or an sTTI may be part of a resource grid that may correspond to a system bandwidth that the base station 105-a may allocate to the UE 115-a. A resource element (RE) in a resource grid, may span one symbol by one sub-carrier. Each RE may carry two, four or six physical channel bits. REs may be grouped into resource blocks (RBs), each of which may span 180 kHz (e.g., 12 sub-carriers). The base station 105-a may allocate RBs to the UE 115-a, by allocating the symbols and sub-carriers within each TTI or sTTI in units of RBs to the UE 115-a. Each TTI or sTTI may span a number of modulation symbol periods (e.g., 0-14 OFDM symbols) and a number of sub-carriers within a bandwidth.

The base station 105-a may transmit one or more PRS occasions 215 to the UE 115-a via bidirectional link 210, and the UE 115-a may monitor and measure the PRS occasions 215. In some examples, the UE 115-a may switch from RRC connected to mode to RRC idle mode to monitor and measure the PRS occasions 215. As part of monitoring and measuring the PRS occasions 215, the UE 115-a may generate and transmit a PRS measurement report to the base station 105-a. To perform PRS measurements in an efficient manner in examples where the UE 115-a is an NB-IoT device, the UE 115-a may determine an order of measuring different PRS occasions across different IF resulting in a minimum active duration for a receiver of the UE 115-a.

Figure 3:
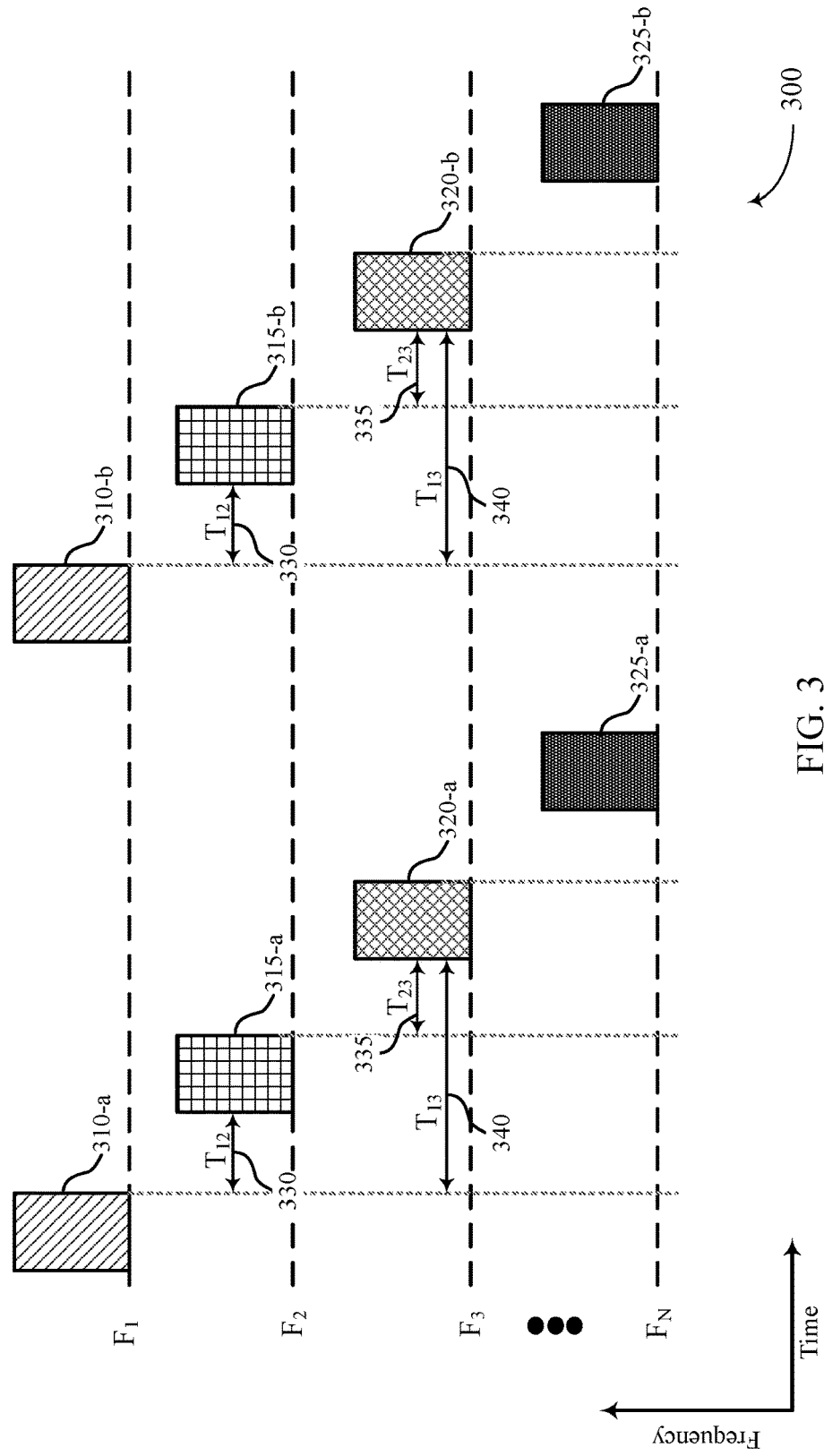
FIG. 3 illustrates an example of a timing diagram that supports selection of PRS occasions in accordance with aspects of the present disclosure.

FIG. 3 illustrates an example of a timing diagram 300 that supports selection of PRS occasions in accordance with aspects of the present disclosure. In some examples, timing diagram 300 may implement aspects of wireless communications system 100 and 200. The timing diagram 300 may support efficient PRS measurements that may enhance communication (e.g., reliability, reduced latency) in the wireless communications system 100 and 200.

With reference to FIG. 3, the UE 115-a may identify, from a plurality of pairs of PRS occasions, a first pair of PRS occasions 310 for monitoring a PRS at a first frequency (e.g., $F_1$). Additionally or alternatively, the UE 115-a may also identify, from the plurality of pairs of PRS occasions, a second pair of PRS occasions 315 for monitoring a PRS at a second frequency (e.g., $F_2$) and a third pair of PRS occasions 320 for monitoring a PRS at a third frequency (e.g., $F_3$). In some examples, the UE 115-a may identify the pair of PRS occasions 310, 315, and/or 320 based on the received message, from the base station 105-a and/or a location server, including PRS scheduling information. The plurality of pairs of PRS occasions 310, 315, and/or 320 may have a certain periodicity, for example, a first PRS and a second PRS of a pair of PRS occasions may be spaced apart by a predetermined period (e.g., N ms, N TTIs, N subframes). As one example, by knowing the periodicity, the UE 115-a may be capable of efficiently evaluating other information for determining an order for PRS measurements and monitoring for the pair of PRS occasions.

In an example where UE 115-a may be an NB-IoT device, the UE 115-a may determine an order of measuring the different PRS occasions 310, 315, and/or 320 resulting in a minimum active duration for a receiver of the UE 115-a. In other techniques, the UE 115-a may measure the different PRS occasions 310, 315, and/or 320 according to a default order. That is, in some examples, the UE 115-a may measure PRS occasion 310 (e.g., a first PRS 310-a and a second PRS 310-b of PRS occasion 310), measure PRS occasion 315 (e.g., a first PRS 315-a and a second PRS 315-b of PRS occasion 315), measure PRS occasion 320 (e.g., a first PRS 320-a and a second PRS 320-b of PRS occasion 320), and so on for different frequency PRS neighbors.

These other techniques, however, are deficient for NB-IoT devices because the receiver remains active for an extended period. As a result, these techniques present measurements latencies that may affect the overall system throughput. To perform PRS measurements in an improved manner, the UE 115-a may determine an order of PRS occasions to be measured across different frequencies that will decrease the duration for which the receiver of the UE 115-a is active. The UE 115-a may determine the order of PRS occasions in a recursive manner as described herein.

The UE 115-a may, before measuring any of the PRS occasions 310, 315, and/or 320, evaluate different information related to each of the PRS occasions 310, 315, and/or 320. For example, the UE 115-a may evaluate tuning time associated with the PRS occasions 310, 315, and/or 320 for tuning a receiver, a voltage-controlled oscillator (VCO), or a phase-locked loop (PLL), or a combination thereof. The tuning time may be based at least in part on if a target band is different from a source band, or if the target band and the source band are same, or a frequency separation between the target band and the source band, or a combination thereof. For example, a tuning time for a receiver or PLL for tuning from low band to mid band may be approximately 3 to 4 ms, while tuning to different frequencies within the low band may take 200 μs to 1 ms. In some cases, the different information (e.g., tuning time) related to each of the PRS occasions 310, 315, and/or 320 may be configured with the UE 115-a, for example, in a lookup table (LUT) stored in local memory of the UE 115-a. Alternatively, the UE 115-a may calculate the different tuning time based on PRS scheduling information.

The UE 115-a may determine a time difference 330 (e.g., $T_{12}$) between an end time of the first PRS 310-a of the first pair of PRS occasions 310 and a start time of the first PRS 315-a of the second pair of PRS occasions 315. Additionally or alternatively, the UE 115-a may determine a time difference 335 (e.g., $T_{13}$) between an end time of the first PRS 310-a of the first pair of PRS occasions 310 and a start time of a first PRS 320-a of the third pair of PRS occasions 320. As such, the time differences (e.g., $T_{xy}$) may indicate a time between an end and start of a PRS occasion at $F_x$ and $F_y$, respectively. Because of the PRS periodicity, the time differences 330 and 335 may be same across the PRS occasions (e.g., a second PRS of the pairs of PRS occasions).

As part of determining the order of PRS occasions to be measured across different frequencies that will decrease the duration for which the receiver of the UE 115-a is active, the UE 115-a may calculate or determine the tuning time $\tau_{xy}$, for example, required to tune from frequency $F_x$ to $F_y$. For example, the UE 115-a may determine a tuning time for tuning a receiver of the UE 115-a from the first frequency (e.g., $F_1$) to the second frequency (e.g., $F_2$), and a tuning time for tuning the receiver of the UE 115-a from the first frequency (e.g., $F_1$) to the third frequency (e.g., $F_3$). The tuning time may be determined by the UE 115-a, in some examples, by parsing a LUT.

Once the UE 115-a has determined the time differences and/or the tuning time, the UE 115-a may for every PRS measurement at $F_x$ determine and identify a neighbor PRS at $F_y$ such that the time difference is greater than the tuning time (e.g., $T_{xy} > \tau_{xy}$) in an upcoming PRS occasion. In some cases where multiple neighboring PRS occasion satisfy this criterion, the UE 115-a may select the neighbor PRS occasion having the minimum time difference (e.g., $T_{xy}$). For example, the UE 115-a may compare at least one of the time difference 330 or the tuning time for the second pair of PRS occasions 315 with at least one of the time difference 340 or the tuning time for the third pair of PRS occasions 320, and select the second pair of PRS occasions 315 or the third pair of PRS occasions 320 based at least in part on the comparison.

In some examples, the UE 115-a may in addition select a neighbor PRS occasions based on the neighbor PRS occasion being separated from the current PRS occasions by a time T that is greater than the time difference $T_{xy}$ (e.g., $T > T_{xy}$). For example, the UE 115-a may determine whether the second pair of PRS occasions 315 is separated from the first pair of PRS occasions 310 by a period that is above a threshold, and select the second pair of PRS occasions 315 based on the period being above the threshold.

Upon determining the order of PRS occasions for PRS measurement, the UE 115-a may monitor and measure the different PRS occasions. For example, the UE 115-a may measure the first PRS 310 of the first pair of PRS occasions 310 at the first frequency. The UE 115-a may then tune from the first frequency to the second frequency, subsequent to measuring the first PRS 310-a at the first frequency. After tuning to the second frequency, the UE 115-a may measure a first PRS 315-a of the second pair of PRS occasions 315 at the second frequency. The UE 115-a may then tune from the second frequency to the third frequency, subsequent to measuring the first PRS 315-a at the second frequency and measure a first PRS 320-a of the third pair of PRS occasions 320 at the third frequency.

The UE 115-*a* may then tune from the third frequency to the first frequency, subsequent to measuring the first PRS 315-*a* of the third pair of PRS occasions 315 at the third frequency, to measure a second PRS 310-*b* of the first pair of PRS occasions 310 at the first frequency. Similarly, as described herein the UE 115-*a* may tune to the second frequency to measure a second PRS 315-*b* of the second pair of PRS occasions 315 at the second frequency after measuring the second PRS 310-*b* of the first pair of PRS occasions 310 at the first frequency. The UE 115-*a* may generate a PRS measurement report based on the measurements, and transmit the report to the base station 105-*a* and/or a location server. The UE 115-*a* may report the PRS measurements in the appropriate order (e.g., pairs of a PRS occasion) by queuing the PRS measurements in local memory and then transmitting them back in the appropriate order.

Although the order of PRS occasions for PRS measurement in some cases may be to measure the first pair of PRS occasions 310, the second pair of PRS occasions 315, and the third pair of PRS occasions 320; the order is different from the other techniques because the UE 115-*a* is capable of measuring a first PRS of a first PRS occasion at a first frequency and tune to a second frequency to measure a first PRS of a second PRS occasions and then tune back to the first frequency to measure a second PRs of the PRS occasion, and so on.

In other words, the UE 115-*a* may save time (e.g., time for which the receiver of the UE 115-*a* is active) by splitting successive PRS measurements so that the UE 115-*a* measures a first PRS of a first PRS occasions at a first frequency, a first PRS of a second PRS occasions at a second frequency, and a first PRS of a third PRS occasions at a third frequency, and then the UE 115-*a* may cycle back to measure a second PRS of the first PRS occasions at the first frequency, a second PRS of the second PRS occasions at the second frequency, and a second PRS of the third PRS occasions at the third frequency. Thereby, the improved techniques described herein provide a mechanism to perform PRS measurements in an efficient manner, by having the UE 115-*a* determine an order of PRS occasions to be measured across different IF that would provide the measurements in the least time period.

Moreover, while these techniques are described with reference to the UE 115-*a* determining the order for PRS measurements, the base station 105-*a* and/or a location server may employ similar techniques for determining the order and communicating it to the UE 115-*a*. By having the base station 105-*a* and/or a location server determine the order may further reduce power consumption of the UE 115-*a* related to processing of the information linked to different PRS. In addition, latency of the wireless communications system may be decreased because the UE 115-*a* will not have to perform the calculations for determining the order.

Figure 4:
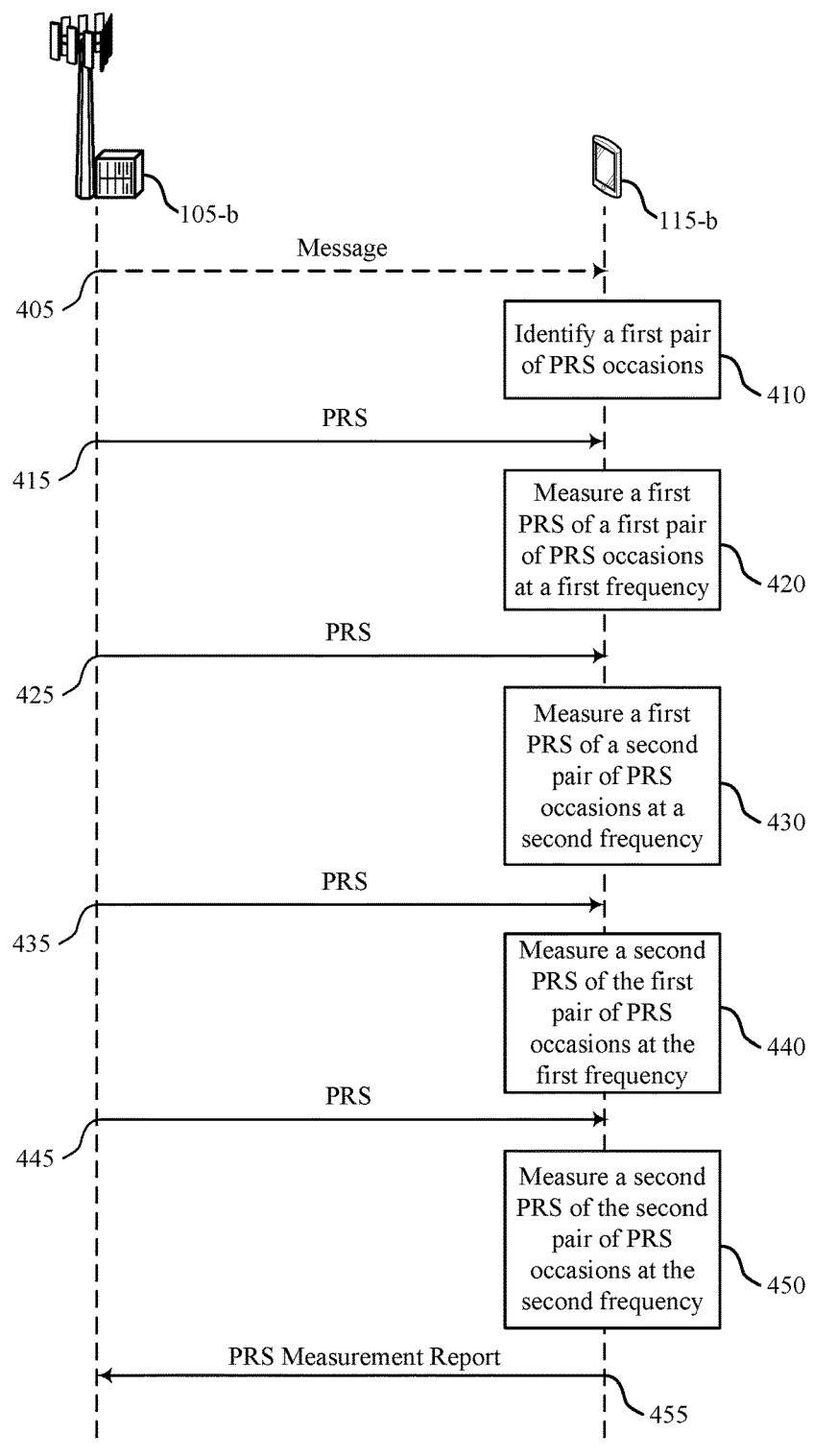
FIG. 4 illustrates an example of a process flow that supports selection of PRS occasions in accordance with aspects of the present disclosure.

FIG. 4 illustrates an example of a process flow 400 that supports selection of PRS occasions in accordance with aspects of the present disclosure. In some examples, process flow 400 may implement aspects of wireless communications system 100. The process flow 400 may also support PRS transmission repetitions for downlink and uplink transmissions in an efficient manner to enhance communication (e.g., reliability, reduced latency) in a wireless communications system. Base station 105-*b* and UE 115-*b* may be examples of the corresponding devices described with reference to FIGS. 1 and 2. In some examples, the base station 105-*b* may be a location server.

In the following description of the process flow 400, the operations between the base station 105-*b* and the UE 115-*b* may be transmitted in a different order than the exemplary order shown, or the operations performed by the base station 105-*b* and the UE 115-*b* may be performed in different orders or at different times. The example(s) provided are nonlimiting. Certain operations may also be omitted from the process flow 400, or other operations may be added to the process flow 400, or both.

The process flow 400 may commence with the base station 105-*b* establishing a connection with the UE 115-*b* (e.g., performing a cell acquisition procedure, a random access procedure, an RRC connection procedure, an RRC configuration procedure). The base station 105-*b* may send PRS scheduling information (e.g., in control information) to the UE 115-*b* to schedule either uplink or downlink PRS transmission repetitions for a PRS occasion, as part of the connection establishment.

At 405, the base station 105-*b* may optionally transmit a message to the UE 115-*b*. The message may include instructions to perform PRS measurements according to a PRS occasion order configured by the base station 105-*b*. A location server (different from the base station 105-*b*) may also transmit the message to the UE 115-*b*. In some examples, the UE 115-*b* may retrieve PRS scheduling information from local memory and transmit the information to the base station 105-*b* and/or a location server. PRS scheduling information may include a number of pairs of PRS occasions, a PRS periodicity of the pairs of PRS occasions, a PRS bandwidth (e.g., specifies the bandwidth (RBs) that are used to configure the PRS), a PRS subframe offset, etc.

At 410, the UE 115-*b* may identify a first pair of PRS occasions. For example, the UE 115-*b* may identify the first pair of PRS occasions for monitoring a PRS at a first frequency (e.g., source frequency) based at least in part on the received message from the base station 105-*b* and/or a location server. In some examples, the UE 115-*b* may identify a second pair of PRS occasions for monitoring a PRS at the second frequency and a third pair of PRS occasions for monitoring a PRS at a third frequency based at least in part on the received message from the base station 105-*b* and/or a location server. To perform PRS measurements in an efficient manner, the UE 115-*b* may determine an order of PRS occasions to be measured across different frequencies that would provide the measurement in the least time period thereby causing minimum current consumption across all possible measurement combinations.

For example, the UE 115-*b* may determine a time difference between an end time of the first PRS of the first pair of PRS occasions and a start time of the first PRS of the second pair of PRS occasions, and determine a tuning time for tuning a receiver of the UE 115-*b* from the first frequency to the second frequency. The UE 115-*b* may also determine a time difference between an end time of the first PRS of the first pair of PRS occasions and a start time of a first PRS of the third pair of PRS occasions, and determine a tuning time for tuning the receiver of the UE 115-*b* from the first frequency to the third frequency. The order of the PRS occasions may be determined by the UE 115-*b* by comparing at least one of the time difference or the tuning time for the second pair of PRS occasions with at least one of the time difference or the tuning time for the third pair of PRS occasions. Based on the order the UE 115-*b* may monitor and measure PRS transmitted from the base station 105-*b* and/or a location server.

At 415, the base station 105-*b* may transmit a PRS to the UE 115-*b*. For example, the base station 105-*b* may transmit a first PRS of the first pair of PRS occasions at the first frequency. At 420, the UE **115-*b*** may measure the first PRS of the first pair of PRS occasions at the first frequency.

At 425, the base station **105-*b* may transmit a PRS to the UE 115-*b*. For example, the base station 105-*b* may transmit a first PRS of the second pair of PRS occasions at the second frequency. At 430, the UE 115-*b* may measure the first PRS of the second pair of PRS occasions at the second frequency. In some examples, the UE 115-*b*** may tune from the first frequency to the second frequency, subsequent to measuring the first PRS at the first frequency.

At 435, the base station **105-*b* may transmit a PRS to the UE 115-*b*. For example, the base station 105-*b* may transmit a second PRS of the first pair of PRS occasions at the first frequency. In some examples, the UE 115-*b* may tune from the second frequency to the first frequency, subsequent to measuring the first PRS of the second pair of PRS occasions at the second frequency. At 440, the UE 115-*b*** may measure the second PRS of the first pair of PRS occasions at the first frequency.

At 445, the base station **105-*b* may transmit a PRS to the UE 115-*b*. For example, the base station 105-*b* may transmit a second PRS of the second pair of PRS occasions at the second frequency. In some examples, the UE 115-*b* may tune from the first frequency to the second frequency, subsequent to measuring the second PRS of the first pair of PRS occasions at the first frequency. At 450, the UE 115-*b*** may measure the second PRS of the second pair of PRS occasions at the second frequency.

At 455, the UE **115-*b* may transmit a PRS measurement report. For example, the UE 115-*b* may generate a PRS measurement report based on the PRS measurements performed across the different frequencies (e.g., first and second frequency), and transmit the report to the base station 105-*b*** and/or a location server (e.g., a network location server).

Figure 5:
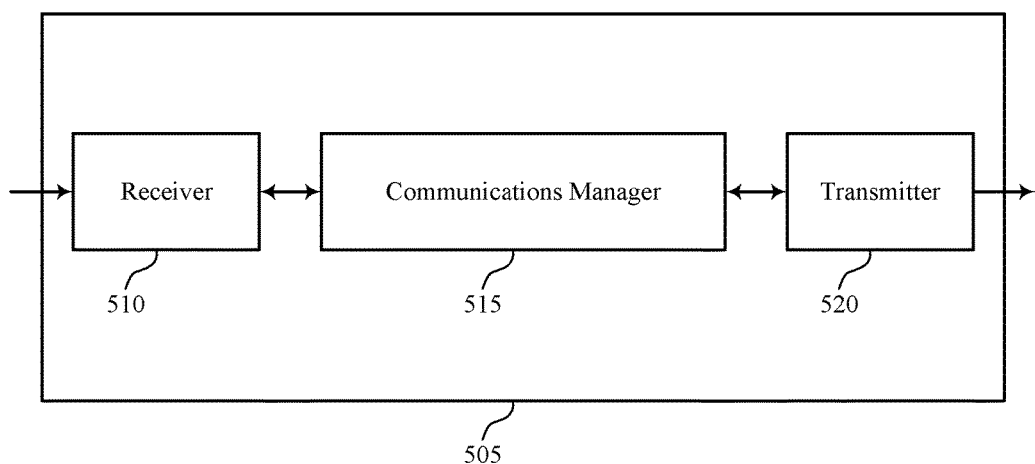
FIGS. 5 and 6 show block diagrams of devices that support selection of PRS occasions in accordance with aspects of the present disclosure.

FIG. 5 shows a block diagram 500 of a device 505 that supports selection of PRS occasions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to selection of PRS occasions, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 and/or one or more components of the communications manager 515 may perform and/or be a means for performing, either alone or in combination with other elements, one or more operations for selection of PRS occasions. The communications manager 515 may identify a first pair of PRS occasions for monitoring a PRS at a first frequency and a second pair of PRS occasions for monitoring a PRS at a second frequency and occurring after the first pair of PRS occasions, measure a first PRS of the first pair of PRS occasions at the first frequency, measure a first PRS of the second pair of PRS occasions at the second frequency, and measure a second PRS of the first pair of PRS occasions at the first frequency after measuring the first PRS of the second pair of PRS occasions at the second frequency. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
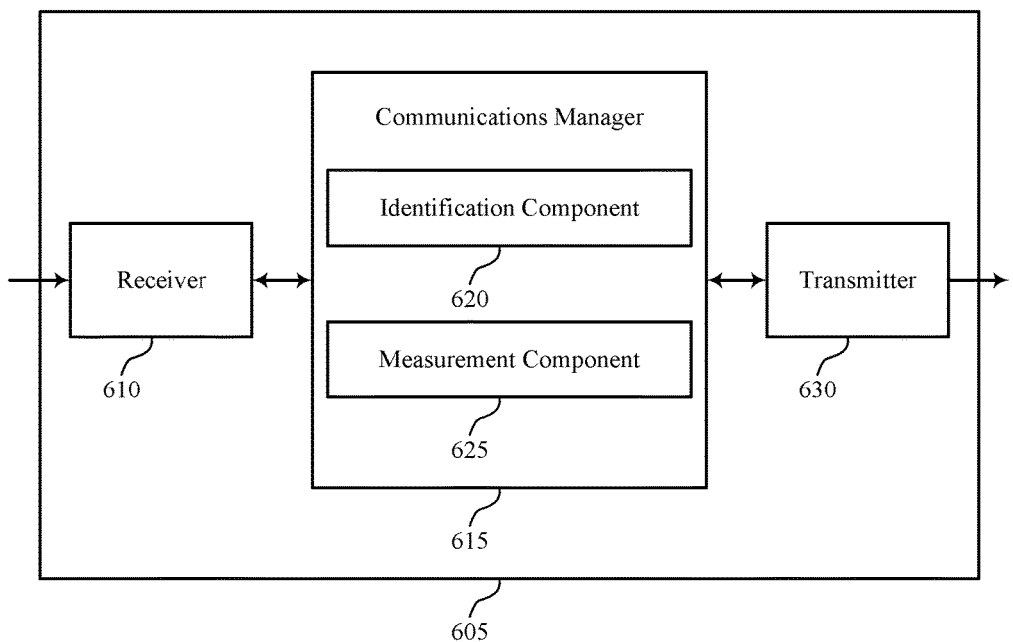

FIG. 6 shows a block diagram 600 of a device 605 that supports selection of PRS occasions in accordance with aspects of the present disclosure. The device 605 may be an example of aspects of a device 505 or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to selection of PRS occasions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an identification component 620 and a measurement component 625. The communications manager 615 may be an example of aspects of the communications manager 810 described herein. The communications manager 615 and/or one or more components of the communications manager 615 may perform and/or be a means for performing, either alone or in combination with other elements, one or more operations for selection of PRS occasions.

The identification component 620 may identify a first pair of PRS occasions for monitoring a PRS at a first frequency and a second pair of PRS occasions for monitoring a PRS at a second frequency and occurring after the first pair of PRS occasions. The measurement component 625 may measure a first PRS of the first pair of PRS occasions at the first frequency, measure a first PRS of the second pair of PRS occasions at the second frequency, and measure a second PRS of the first pair of PRS occasions at the first frequency after measuring the first PRS of the second pair of PRS occasions at the second frequency.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
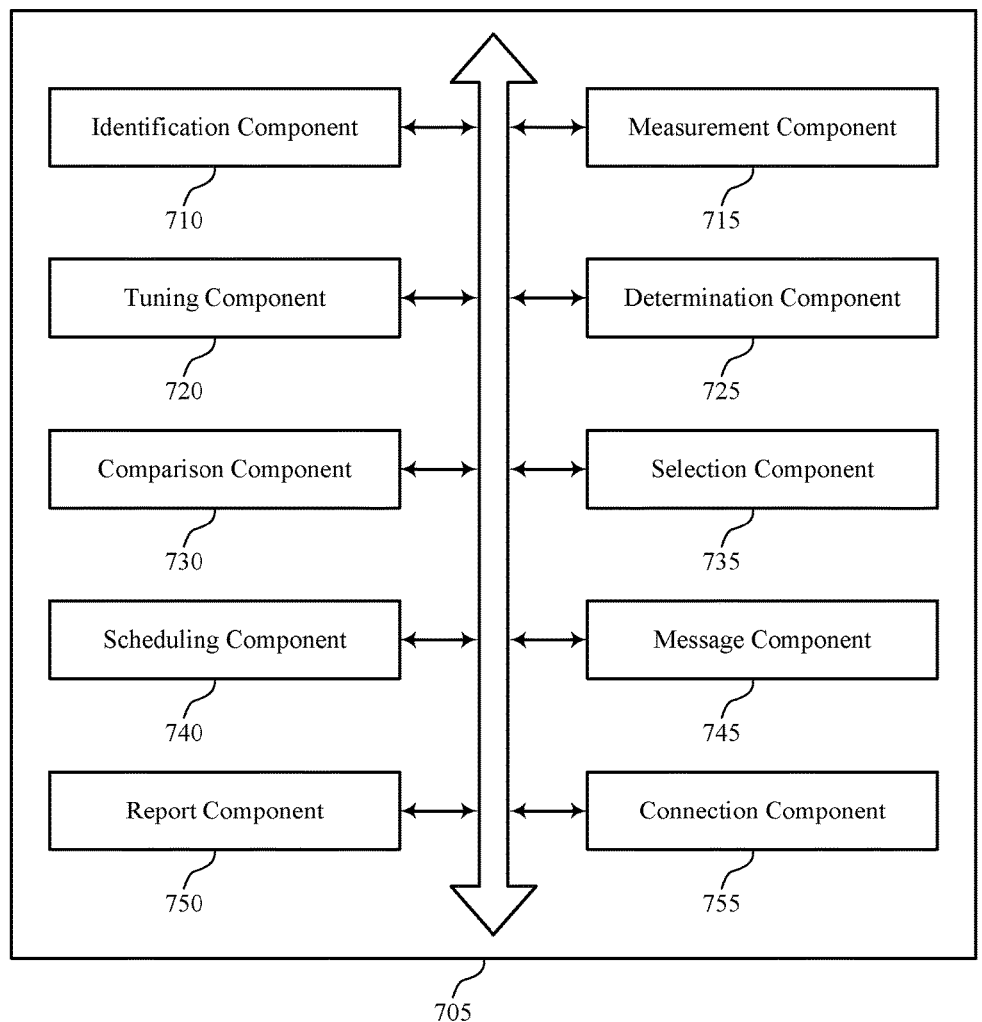
FIG. 7 shows a block diagram of a communications manager that supports selection of PRS occasions in accordance with aspects of the present disclosure.

FIG. 7 shows a block diagram 700 of a communications manager 705 that supports selection of PRS occasions in accordance with aspects of the present disclosure. The communications manager 705 may be an example of aspects of a communications manager 515, a communications manager 615, or a communications manager 810 described herein. The communications manager 705 and/or one or more components of the communications manager 705 may perform and/or be a means for performing, either alone or in combination with other elements, one or more operations for selection of PRS occasions.

The communications manager 705 may include an identification component 710, a measurement component 715, a tuning component 720, a determination component 725, a comparison component 730, a selection component 735, a scheduling component 740, a message component 745, a report component 750, and a connection component 755. Each of these modules may communicate, directly or indirectly, with one another (e.g., via one or more buses).

The identification component 710 may identify a first pair of PRS occasions for monitoring a PRS at a first frequency and a second pair of PRS occasions for monitoring a PRS at a second frequency and occurring after the first pair of PRS occasions. In some examples, the identification component 710 may identify, from a set of pairs of PRS occasions, the second pair of PRS occasions for monitoring a PRS at the second frequency based on PRS scheduling information. In some examples, the identification component 710 may identify, from the set of pairs of PRS occasions, a third pair of PRS occasions for monitoring a PRS at a third frequency based on PRS scheduling information, where the set of pairs of PRS occasions includes the first pair of PRS occasions.

In some examples, the identification component 710 may identify whether a frequency band of the first frequency is different from a frequency band of the second frequency or the third frequency, or both. In some examples, determining the tuning time for tuning the receiver of the UE from the first frequency to the second frequency or the third frequency is further based on whether the frequency band of the first frequency is different from the frequency band of the second frequency or the third frequency, or both. In some examples, the identification component 710 may identify that a frequency band of the first frequency is different from a frequency band of the second frequency.

The measurement component 715 may measure a first PRS of the first pair of PRS occasions at the first frequency. In some examples, the measurement component 715 may measure a first PRS of the second pair of PRS occasions at the second frequency. In some examples, the measurement component 715 may measure a second PRS of the first pair of PRS occasions at the first frequency after measuring the first PRS of the second pair of PRS occasions at the second frequency. In some examples, the measurement component 715 may measure a second PRS of the second pair of PRS occasions at the second frequency after measuring the second PRS of the first pair of PRS occasions at the first frequency.

The tuning component 720 may tune from the first frequency to the second frequency, subsequent to measuring the second PRS of the first pair of PRS occasions at the first frequency, where measuring the second PRS of the second pair of PRS occasions is further based on the tuning. In some examples, the tuning component 720 may tune from the first frequency to the second frequency, subsequent to measuring the first PRS at the first frequency, where measuring the first PRS of the second pair of PRS occasions at the second frequency is further based on the tuning. In some examples, the tuning component 720 may tune from the second frequency to the first frequency, subsequent to measuring the first PRS of the second pair of PRS occasions at the second frequency, where measuring the second PRS of the first pair of PRS occasions at the first frequency is further based on the tuning.

The determination component 725 may determine a time difference between an end time of the first PRS of the first pair of PRS occasions and a start time of the first PRS of the second pair of PRS occasions. In some examples, the determination component 725 may determine a tuning time for tuning a receiver of the UE from the first frequency to the second frequency, where measuring the first PRS of the second pair of PRS occasions at the second frequency is further based on the time difference and the tuning time. In some examples, the determination component 725 may determine a time difference between an end time of the first PRS of the first pair of PRS occasions and a start time of a first PRS of the third pair of PRS occasions.

In some examples, the determination component 725 may determine a tuning time for tuning the receiver of the UE from the first frequency to the third frequency. In some examples, the determination component 725 may determine whether the second pair of PRS occasions is separated from the first pair of PRS occasions by a period that is above a threshold, where selecting the second pair of PRS occasions is further based on determining that the period is above the threshold. In some examples, the determination component 725 may determine a frequency separation between the first frequency and the second frequency, where determining the tuning time for tuning the receiver of the UE from the first frequency to the second frequency is further based on the frequency separation.

The comparison component 730 may compare at least one of the time difference or the tuning time for the second pair of PRS occasions with at least one of the time difference or the tuning time for the third pair of PRS occasions. The selection component 735 may select the second pair of PRS occasions based on the comparing, where measuring the first PRS of the second pair of PRS occasions at the second frequency is further based on the selecting.

The scheduling component 740 may retrieve the PRS scheduling information from local memory of the UE, the PRS scheduling information including the set of pairs of PRS occasions and a PRS periodicity of the set of pairs of PRS occasions. In some examples, the scheduling component 740 may transmit the PRS scheduling information to a location server.

The message component 745 may receive, from a location server, a message including instructions to perform PRS measurements according to a PRS occasion order configured by the location server based on the transmitting, where measuring the first pair of PRS occasions, the second pair of PRS occasions, or the third pair of PRS occasions, or a combination thereof is further based on the PRS occasion order configured by the location server. The report component 750 may generate a PRS measurement report. In some examples, the report component 750 may transmit the PRS measurement report to the base station or the location server, or both. The connection component 755 may establish an RRC connection with a base station or a location server, or both.

Figure 8:
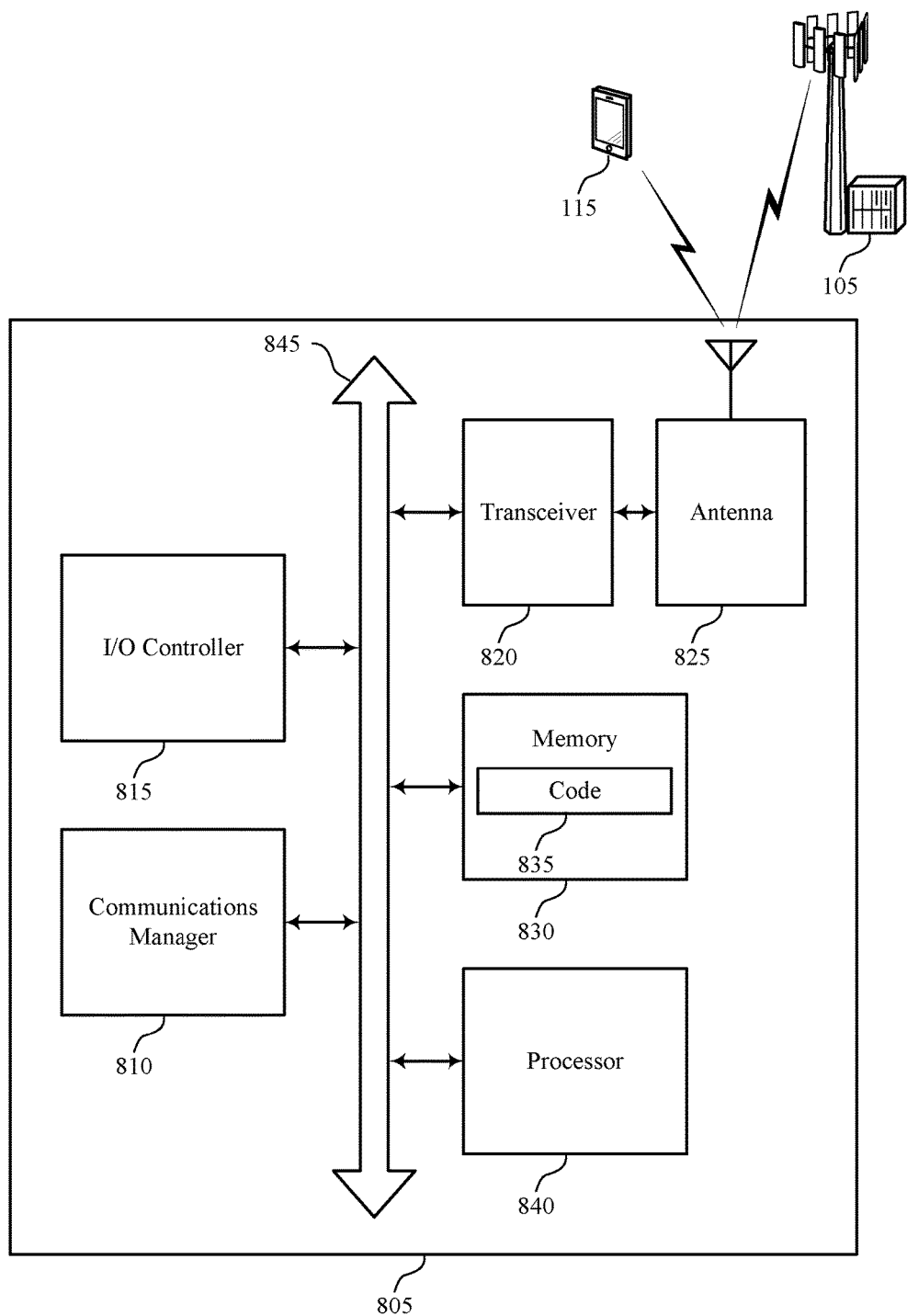
FIG. 8 shows a diagram of a system including a device that supports selection of PRS occasions in accordance with aspects of the present disclosure.

FIG. 8 shows a diagram of a system 800 including a device 805 that supports selection of PRS occasions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a first pair of PRS occasions for monitoring a PRS at a first frequency and a second pair of PRS occasions for monitoring a PRS at a second frequency and occurring after the first pair of PRS occasions, measure a first PRS of the first pair of PRS occasions at the first frequency, measure a first PRS of the second pair of PRS occasions at the second frequency, and measure a second PRS of the first pair of PRS occasions at the first frequency after measuring the first PRS of the second pair of PRS occasions at the second frequency. The communications manager 810 and/or one or more components of the communications manager 810 may perform and/or be a means for performing, either alone or in combination with other elements, one or more operations for selection of PRS occasions.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting selection of PRS occasions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
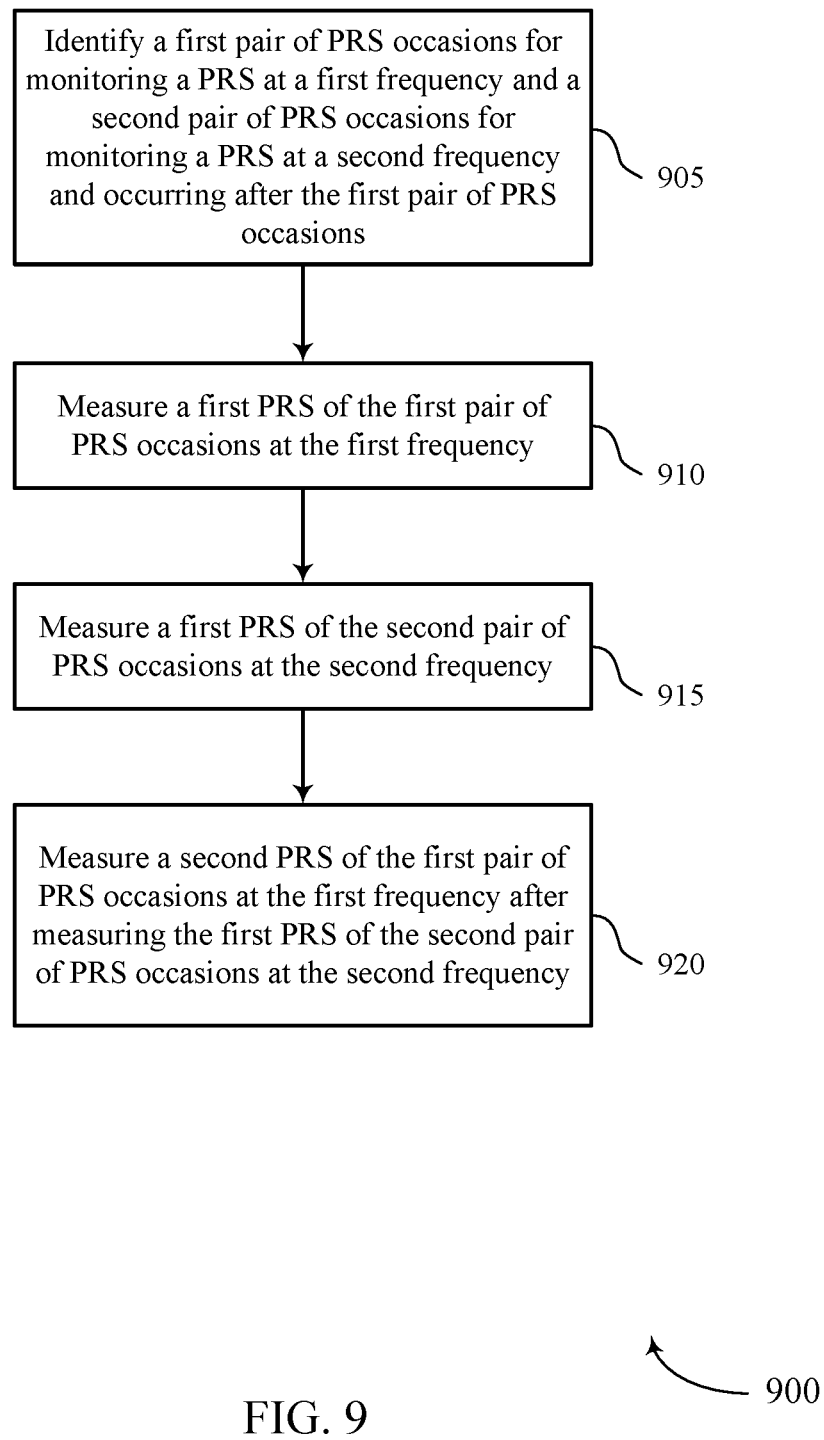
FIGS. 9 through 12 show flowcharts illustrating methods that support selection of PRS occasions in accordance with aspects of the present disclosure.

FIG. 9 shows a flowchart illustrating a method 900 that supports selection of PRS occasions in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify a first pair of PRS occasions for monitoring a PRS at a first frequency and a second pair of PRS occasions for monitoring a PRS at a second frequency and occurring after the first pair of PRS occasions. The operations of 905 may be performed according to the methods described herein. In some examples, aspects of the operations of 905 may be performed by an identification component as described with reference to FIGS. 5 through 8.

At 910, the UE may measure a first PRS of the first pair of PRS occasions at the first frequency. The operations of 910 may be performed according to the methods described herein. In some examples, aspects of the operations of 910 may be performed by a measurement component as described with reference to FIGS. 5 through 8.

At 915, the UE may measure a first PRS of the second pair of PRS occasions at the second frequency. The operations of 915 may be performed according to the methods described herein. In some examples, aspects of the operations of 915 may be performed by a measurement component as described with reference to FIGS. 5 through 8.

At 920, the UE may measure a second PRS of the first pair of PRS occasions at the first frequency after measuring the first PRS of the second pair of PRS occasions at the second frequency. The operations of 920 may be performed according to the methods described herein. In some examples, aspects of the operations of 920 may be performed by a measurement component as described with reference to FIGS. 5 through 8.

Figure 10:
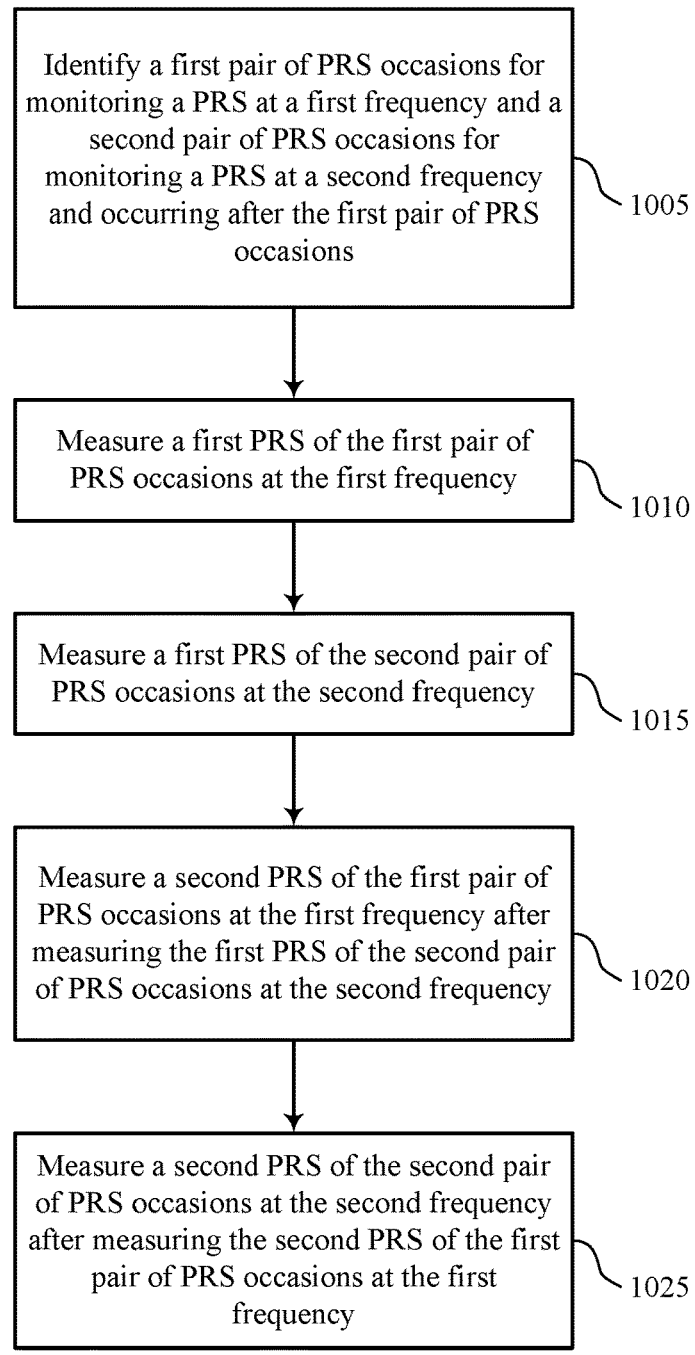

FIG. 10 shows a flowchart illustrating a method 1000 that supports selection of PRS occasions in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify a first pair of PRS occasions for monitoring a PRS at a first frequency and a second pair of PRS occasions for monitoring a PRS at a second frequency and occurring after the first pair of PRS occasions. The operations of 1005 may be performed according to the methods described herein. In some examples, aspects of the operations of 1005 may be performed by an identification component as described with reference to FIGS. 5 through 8.

At 1010, the UE may measure a first PRS of the first pair of PRS occasions at the first frequency. The operations of 1010 may be performed according to the methods described herein. In some examples, aspects of the operations of 1010 may be performed by a measurement component as described with reference to FIGS. 5 through 8.

At 1015, the UE may measure a first PRS of the second pair of PRS occasions at the second frequency. The operations of 1015 may be performed according to the methods described herein. In some examples, aspects of the operations of 1015 may be performed by a measurement component as described with reference to FIGS. 5 through 8.

At 1020, the UE may measure a second PRS of the first pair of PRS occasions at the first frequency after measuring the first PRS of the second pair of PRS occasions at the second frequency. The operations of 1020 may be performed according to the methods described herein. In some examples, aspects of the operations of 1020 may be performed by a measurement component as described with reference to FIGS. 5 through 8.

At 1025, the UE may measure a second PRS of the second pair of PRS occasions at the second frequency after measuring the second PRS of the first pair of PRS occasions at the first frequency. The operations of 1025 may be performed according to the methods described herein. In some examples, aspects of the operations of 1025 may be performed by a measurement component as described with reference to FIGS. 5 through 8.

Figure 11:
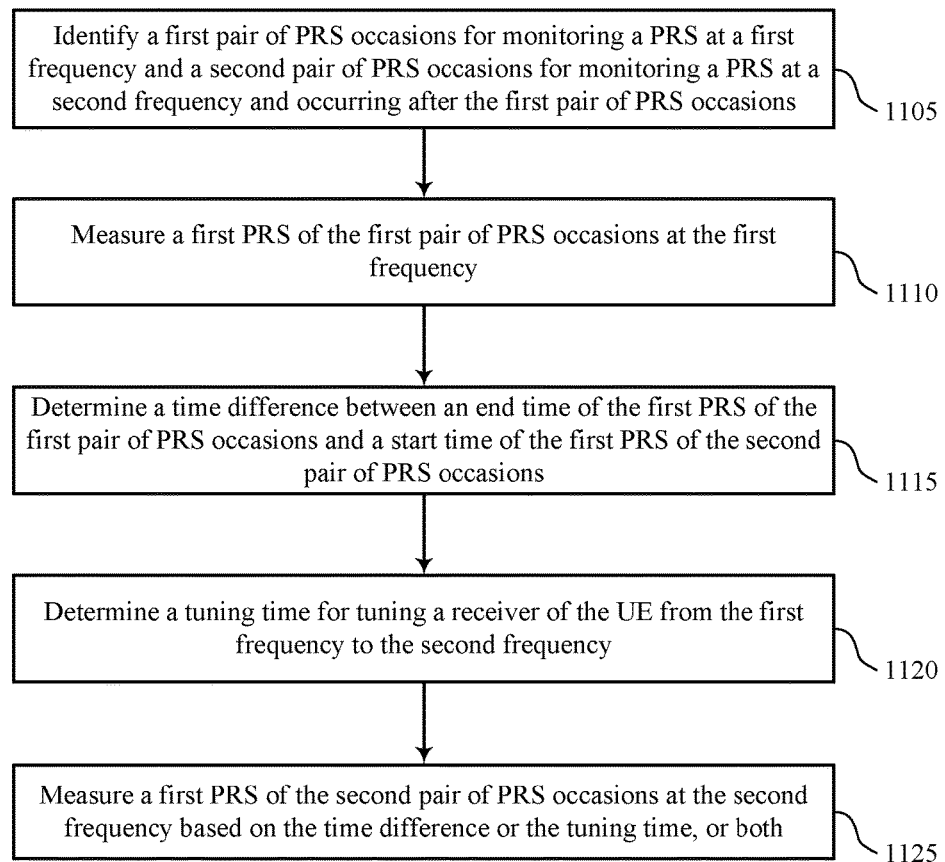

FIG. 11 shows a flowchart illustrating a method 1100 that supports selection of PRS occasions in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may identify a first pair of PRS occasions for monitoring a PRS at a first frequency and a second pair of PRS occasions for monitoring a PRS at a second frequency and occurring after the first pair of PRS occasions. The operations of 1105 may be performed according to the methods described herein. In some examples, aspects of the operations of 1105 may be performed by an identification component as described with reference to FIGS. 5 through 8.

At 1110, the UE may measure a first PRS of the first pair of PRS occasions at the first frequency. The operations of 1110 may be performed according to the methods described herein. In some examples, aspects of the operations of 1110 may be performed by a measurement component as described with reference to FIGS. 5 through 8.

At 1115, the UE may determine a time difference between an end time of the first PRS of the first pair of PRS occasions and a start time of the first PRS of the second pair of PRS occasions. The operations of 1115 may be performed according to the methods described herein. In some examples, aspects of the operations of 1115 may be performed by a determination component as described with reference to FIGS. 5 through 8.

At 1120, the UE may determine a tuning time for tuning a receiver of the UE from the first frequency to the second frequency. The operations of 1120 may be performed according to the methods described herein. In some examples, aspects of the operations of 1120 may be performed by a determination component as described with reference to FIGS. 5 through 8.

At 1125, the UE may measure a first PRS of the second pair of PRS occasions at the second frequency based on the time difference or the tuning time, or both. The operations of 1125 may be performed according to the methods described herein. In some examples, aspects of the operations of 1125 may be performed by a measurement component as described with reference to FIGS. 5 through 8.

Figure 12:
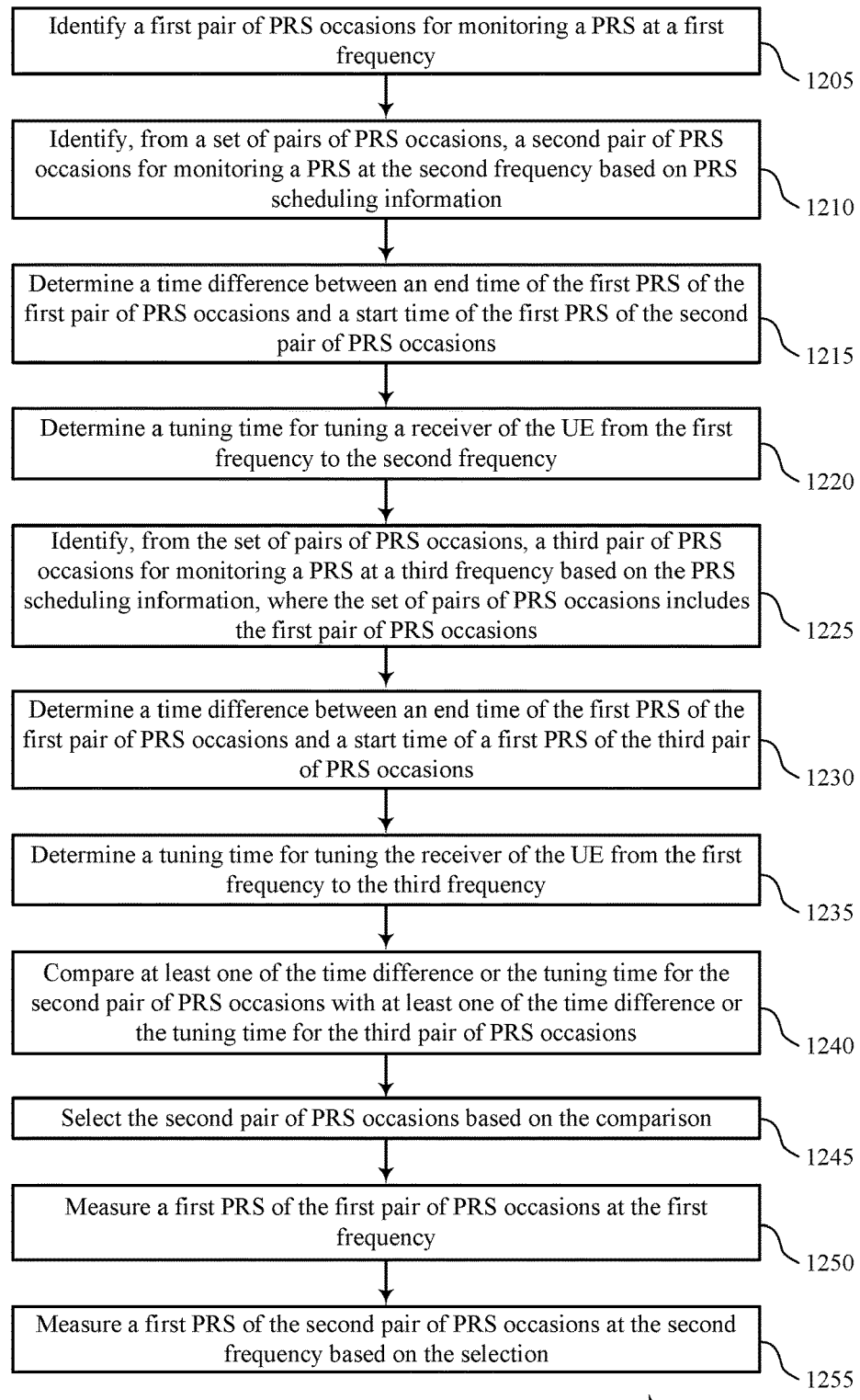

FIG. 12 shows a flowchart illustrating a method 1200 that supports selection of PRS occasions in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may identify a first pair of PRS occasions for monitoring a PRS at a first frequency and a second pair of PRS occasions for monitoring a PRS at a second frequency and occurring after the first pair of PRS occasions. The operations of 1205 may be performed according to the methods described herein. In some examples, aspects of the operations of 1205 may be performed by an identification component as described with reference to FIGS. 5 through 8.

At 1210, the UE may identify, from a set of pairs of PRS occasions, a second pair of PRS occasions for monitoring a PRS at the second frequency based on PRS scheduling information. The operations of 1210 may be performed according to the methods described herein. In some examples, aspects of the operations of 1210 may be performed by an identification component as described with reference to FIGS. 5 through 8.

At 1215, the UE may determine a time difference between an end time of the first PRS of the first pair of PRS occasions and a start time of the first PRS of the second pair of PRS occasions. The operations of 1215 may be performed according to the methods described herein. In some examples, aspects of the operations of 1215 may be performed by a determination component as described with reference to FIGS. 5 through 8.

At 1220, the UE may determine a tuning time for tuning a receiver of the UE from the first frequency to the second frequency. The operations of 1220 may be performed according to the methods described herein. In some examples, aspects of the operations of 1220 may be performed by a determination component as described with reference to FIGS. 5 through 8.

At 1225, the UE may identify, from the set of pairs of PRS occasions, a third pair of PRS occasions for monitoring a PRS at a third frequency based on the PRS scheduling information, where the set of PRS occasions includes the first pair of PRS occasions. The operations of 1225 may be performed according to the methods described herein. In some examples, aspects of the operations of 1225 may be performed by an identification component as described with reference to FIGS. 5 through 8.

At 1230, the UE may determine a time difference between an end time of the first PRS of the first pair of PRS occasions and a start time of a first PRS of the third pair of PRS occasions. The operations of 1230 may be performed according to the methods described herein. In some examples, aspects of the operations of 1230 may be performed by a determination component as described with reference to FIGS. 5 through 8.

At 1235, the UE may determine a tuning time for tuning the receiver of the UE from the first frequency to the third frequency. The operations of 1235 may be performed according to the methods described herein. In some examples, aspects of the operations of 1235 may be performed by a determination component as described with reference to FIGS. 5 through 8.

At 1240, the UE may compare at least one of the time difference or the tuning time for the second pair of PRS occasions with at least one of the time difference or the tuning time for the third pair of PRS occasions. The operations of 1240 may be performed according to the methods described herein. In some examples, aspects of the operations of 1240 may be performed by a comparison component as described with reference to FIGS. 5 through 8.

At 1245, the UE may select the second pair of PRS occasions based on the comparison. The operations of 1245 may be performed according to the methods described herein. In some examples, aspects of the operations of 1245 may be performed by a selection component as described with reference to FIGS. 5 through 8.

At 1250, the UE may measure a first PRS of the first pair of PRS occasions at the first frequency. The operations of 1250 may be performed according to the methods described herein. In some examples, aspects of the operations of 1250 may be performed by a measurement component as described with reference to FIGS. 5 through 8.

At 1255, the UE may measure a first PRS of the second pair of PRS occasions at the second frequency based on the selection. The operations of 1255 may be performed according to the methods described herein. In some examples, aspects of the operations of 1255 may be performed by a measurement component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

identifying a first pair of positioning reference signal (PRS) occasions for monitoring a PRS at a first frequency and a second pair of PRS occasions for monitoring a PRS at a second frequency and occurring after the first pair of PRS occasions;

measuring a first PRS of the first pair of PRS occasions at the first frequency;

measuring a first PRS of the second pair of PRS occasions at the second frequency;

measuring a second PRS of the first pair of PRS occasions at the first frequency after measuring the first PRS of the second pair of PRS occasions at the second frequency;

generating a PRS measurement report;

establishing a radio resource control (RRC) connection with a base station or a location server, or both; and transmitting the PRS measurement report to the base station or the location server, or both using the RRC connection.

2. The method of claim 1, further comprising:
measuring a second PRS of the second pair of PRS occasions at the second frequency after measuring the second PRS of the first pair of PRS occasions at the first frequency.

3. The method of claim 2, further comprising:
tuning from the first frequency to the second frequency, subsequent to measuring the second PRS of the first pair of PRS occasions at the first frequency, wherein measuring the second PRS of the second pair of PRS occasions is further based at least in part on the tuning.

4. The method of claim 1, further comprising:
determining a time difference between an end time of the first PRS of the first pair of PRS occasions and a start time of the first PRS of the second pair of PRS occasions; and
determining a tuning time for tuning a receiver of the UE from the first frequency to the second frequency, wherein measuring the first PRS of the second pair of PRS occasions at the second frequency is further based at least in part on the time difference and the tuning time.

5. The method of claim 4, further comprising:
identifying, from a plurality of pairs of PRS occasions, the second pair of PRS occasions for monitoring a PRS at the second frequency based at least in part on PRS scheduling information; and
identifying, from the plurality of pairs of PRS occasions, a third pair of PRS occasions for monitoring a PRS at a third frequency based at least in part on the PRS scheduling information, wherein the plurality of pairs of PRS occasions comprises the first pair of PRS occasions.

6. The method of claim 5, further comprising:
determining a time difference between an end time of the first PRS of the first pair of PRS occasions and a start time of a first PRS of the third pair of PRS occasions; and
determining a tuning time for tuning the receiver of the UE from the first frequency to the third frequency.

7. The method of claim 6, further comprising:
comparing at least one of the time difference or the tuning time for the second pair of PRS occasions with at least one of the time difference or the tuning time for the third pair of PRS occasions; and
selecting the second pair of PRS occasions based at least in part on the comparing, wherein measuring the first PRS of the second pair of PRS occasions at the second frequency is further based at least in part on the selecting.

8. The method of claim 7, further comprising:
determining whether the second pair of PRS occasions is separated from the first pair of PRS occasions by a period that is above a threshold, wherein selecting the second pair of PRS occasions is further based at least in part on determining that the period is above the threshold.

9. The method of claim 6, further comprising:
identifying whether a frequency band of the first frequency is different from a frequency band of the second frequency or the third frequency, or both, wherein determining the tuning time for tuning the receiver of the UE from the first frequency to the second frequency or the third frequency is further based at least in part on whether the frequency band of the first frequency is different from the frequency band of the second frequency or the third frequency, or both.

10. The method of claim 5, wherein the first frequency, the second frequency, and the third frequency are different.

11. The method of claim 5, further comprising:
retrieving the PRS scheduling information from local memory of the UE, the PRS scheduling information including the plurality of pairs of PRS occasions and a PRS periodicity of the plurality of pairs of PRS occasions; and
transmitting the PRS scheduling information to a location server.

12. The method of claim 11, further comprising:
receiving, from a location server, a message including instructions to perform PRS measurements according to a PRS occasion order configured by the location server based at least in part on the transmitting, wherein measuring the first pair of PRS occasions, the second pair of PRS occasions, or the third pair of PRS occasions, or a combination thereof is further based at least in part on the PRS occasion order configured by the location server.

13. The method of claim 4, further comprising:
identifying that a frequency band of the first frequency is different from a frequency band of the second frequency; and
determining a frequency separation between the first frequency and the second frequency, wherein determining the tuning time for tuning the receiver of the UE from the first frequency to the second frequency is further based at least in part on the frequency separation.

14. The method of claim 1, further comprising:
tuning from the first frequency to the second frequency, subsequent to measuring the first PRS at the first frequency, wherein measuring the first PRS of the second pair of PRS occasions at the second frequency is further based at least in part on the tuning.

15. The method of claim 14, further comprising:
tuning from the second frequency to the first frequency, subsequent to measuring the first PRS of the second pair of PRS occasions at the second frequency, wherein measuring the second PRS of the first pair of PRS occasions at the first frequency is further based at least in part on the tuning.

16. An apparatus for wireless communications, comprising:
a processor,
memory in electronic communication with the processor; and
instructions stored in the memory and executable by the processor to cause the apparatus to:
identify a first pair of positioning reference signal (PRS) occasions for monitoring a PRS at a first frequency and a second pair of PRS occasions for monitoring a PRS at a second frequency and occurring after the first pair of PRS occasions;
measure a first PRS of the first pair of PRS occasions at the first frequency;
measure a first PRS of the second pair of PRS occasions at the second frequency;
measure a second PRS of the first pair of PRS occasions at the first frequency after measuring the first PRS of the second pair of PRS occasions at the second frequency;
generate a PRS measurement report;

establish a radio resource control (RRC) connection with a base station or a location server, or both; and
transmit the PRS measurement report to the base station or the location server, or both using the RRC connection.

17. The apparatus of claim 16, wherein the instructions are further executable by the processor to cause the apparatus to:
measure a second PRS of the second pair of PRS occasions at the second frequency after measuring the second PRS of the first pair of PRS occasions at the first frequency.

18. The apparatus of claim 17, wherein the instructions are further executable by the processor to cause the apparatus to:
tune from the first frequency to the second frequency, subsequent to measuring the second PRS of the first pair of PRS occasions at the first frequency, wherein measuring the second PRS of the second pair of PRS occasions is further based at least in part on the tuning.

19. An apparatus for wireless communications, comprising:
means for identifying a first pair of positioning reference signal (PRS) occasions for monitoring a PRS at a first frequency and a second pair of PRS occasions for monitoring a PRS at a second frequency and occurring after the first pair of PRS occasions;
means for measuring a first PRS of the first pair of PRS occasions at the first frequency;
means for measuring a first PRS of the second pair of PRS occasions at the second frequency;
means for measuring a second PRS of the first pair of PRS occasions at the first frequency after measuring the first PRS of the second pair of PRS occasions at the second frequency;
means for generating a PRS measurement report;
means for establishing a radio resource control (RRC) connection with a base station or a location server, or both; and
means for transmitting the PRS measurement report to the base station or the location server, or both using the RRC connection.

20. The apparatus of claim 16, wherein the instructions are further executable by the processor to cause the apparatus to:
determine a time difference between an end time of the first PRS of the first pair of PRS occasions and a start time of the first PRS of the second pair of PRS occasions;
determine a tuning time for tuning a receiver of the UE from the first frequency to the second frequency, wherein measuring the first PRS of the second pair of PRS occasions at the second frequency is further based at least in part on the time difference and the tuning time;
identify, from a plurality of pairs of PRS occasions, the second pair of PRS occasions for monitoring a PRS at the second frequency based at least in part on PRS scheduling information; and
identify, from the plurality of pairs of PRS occasions, a third pair of PRS occasions for monitoring a PRS at a third frequency based at least in part on the PRS scheduling information, wherein the plurality of pairs of PRS occasions comprises the first pair of PRS occasions.

* * * * *